(12) United States Patent
Zheng

(10) Patent No.: US 8,186,845 B2
(45) Date of Patent: May 29, 2012

(54) LED LAMP

(75) Inventor: Shi-Song Zheng, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 291 days.

(21) Appl. No.: 12/549,390

(22) Filed: Aug. 28, 2009

(65) Prior Publication Data

US 2011/0012531 A1    Jan. 20, 2011

(30) Foreign Application Priority Data

Jul. 14, 2009  (CN) .......................... 2009 1 0304322

(51) Int. Cl.
*F21L 4/00*   (2006.01)

(52) U.S. Cl. .................. 362/183; 362/249.02; 362/294; 362/373; 362/431

(58) Field of Classification Search .................. 362/183, 362/294, 373, 431, 249.02
See application file for complete search history.

(56) References Cited

U.S. PATENT DOCUMENTS

| | | | |
|---|---|---|---|
| 7,090,370 B2 * | 8/2006 | Clark et al. ................... | 362/183 |
| 7,731,383 B2 * | 6/2010 | Myer ............................. | 362/145 |
| 2010/0296274 A1 * | 11/2010 | Yu et al. ........................ | 362/183 |

* cited by examiner

*Primary Examiner* — Stephen F Husar
*Assistant Examiner* — James Cranson, Jr.
(74) *Attorney, Agent, or Firm* — Altis Law Group, Inc.

(57) ABSTRACT

An LED lamp includes an elongated lamp post, a major light fixed on a top of the lamp post, a solar panel arranged on the lamp post and exposed to sunshine, a battery received in the lamp post and connected to the solar panel, an assistant light fixed on the lamp post, and a driving unit interconnecting the assistant light and the battery to control electric current to the assistant light. The major light consists of a plurality of LEDs. The assistant light consists of LEDs or fiber optic lights.

20 Claims, 4 Drawing Sheets

LED LAMP

BACKGROUND

1. Technical Field

The disclosure generally relates to LED (light emitting diode) lamps, and particularly to an LED lamp incorporating a solar panel as an assistant power source for providing power to decorative lightening of the LED lamp.

2. Description of Related Art

An LED (light emitting diode) has an advantage that it is resistant to shock, and has an almost eternal lifetime under a specific condition; thus, an LED lamp which consists of a plurality of LEDs is intended to be a cost-effective yet high quality replacement for incandescent and fluorescent lamps. Since the LED lamps have many advantages, the LED lamps are more and more popular. Generally, an LED lamp includes a plurality of LEDs being arranged in parallel lines for obtaining a desirable illumination brightness. Following the upgrade of life standard, the LED lamp is required to have not only the illuminating function but also the decorative function.

For the foregoing reasons, therefore, there is a need in the art for an LED lamp which can satisfy the requirement described.

DETAILED DESCRIPTION

Figure 1:
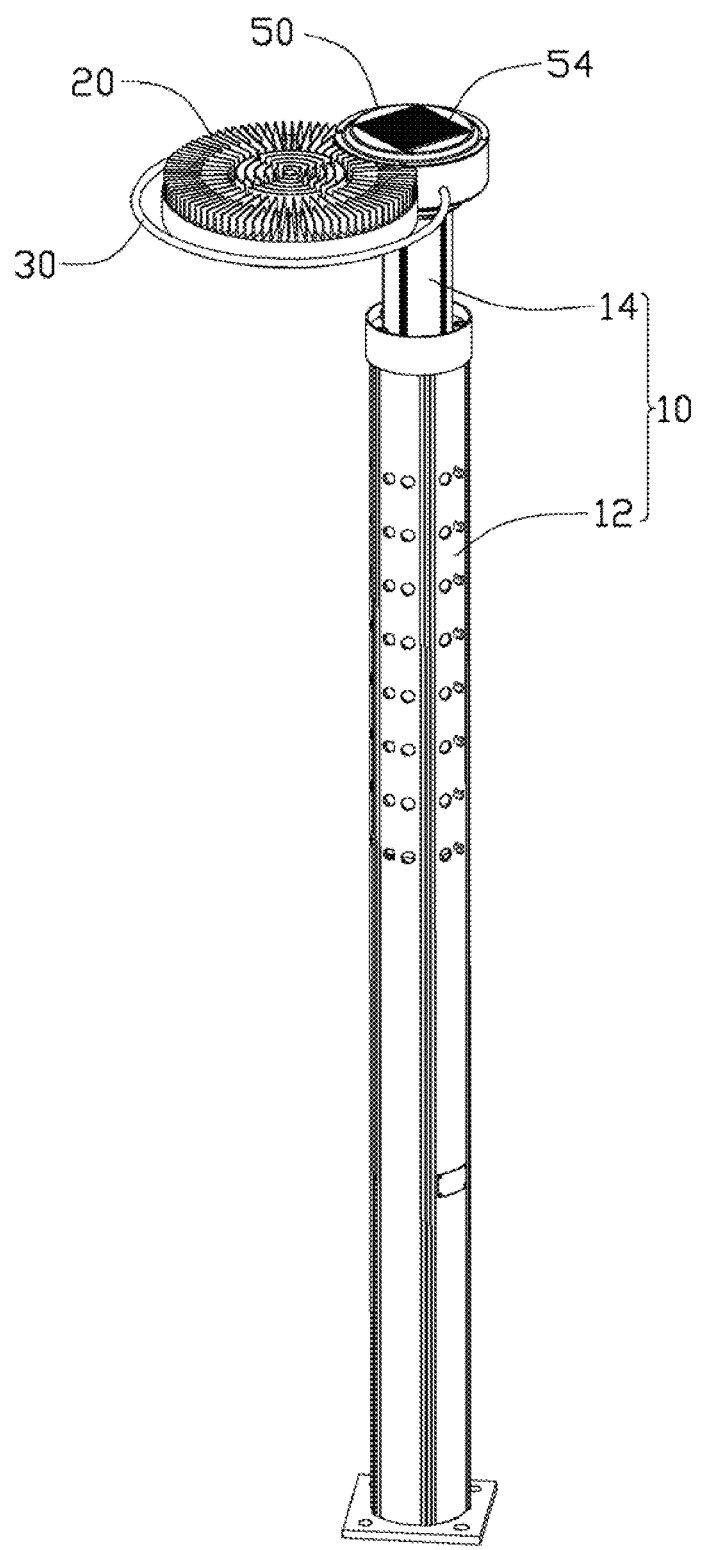
FIG. 1 is an isometric, assembled view of an LED lamp according to an exemplary embodiment.
Figure 2:
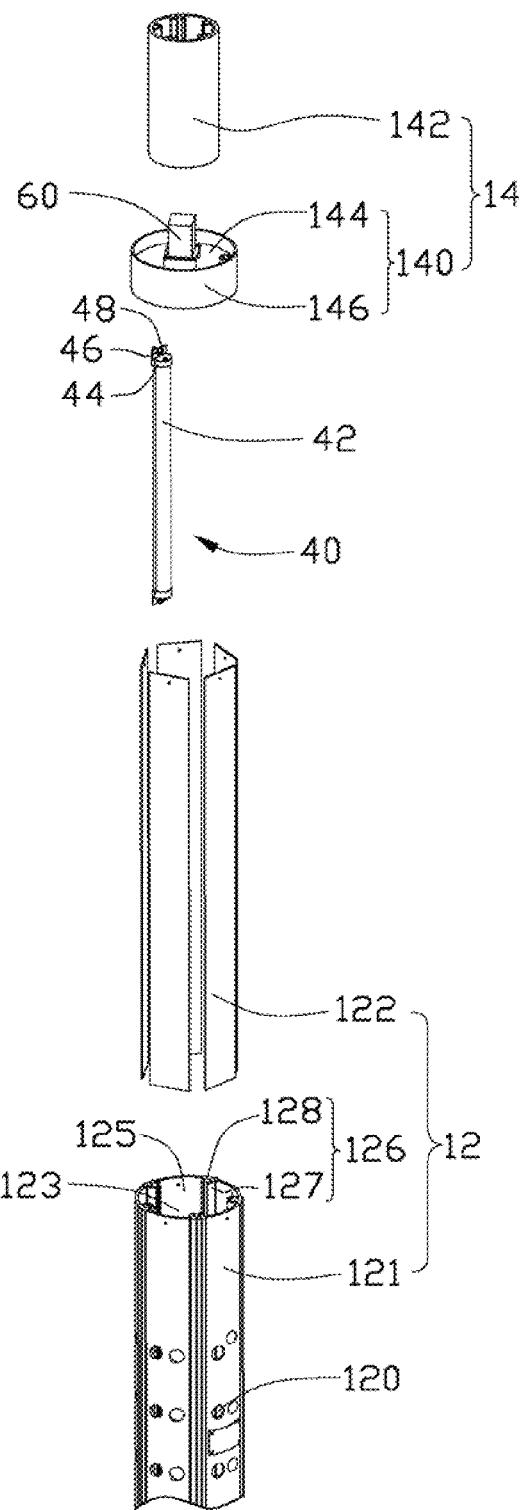
FIG. 2 is an exploded view of a lamp post of the LED lamp of FIG. 1.

Referring to FIGS. 1 and 2, an LED lamp according to an exemplary embodiment, which is mainly used as a street lamp or a park lamp, includes a lamp post 10, a major light 20, a first assistant light 40, a second assistant light 30, an electric member 50, and a rechargeable battery 60. The electric member 50 is connected to the rechargeable battery 60 electrically, and the first and second assistant lights 40, 30 both are connected to the electric member 50 and the rechargeable battery 60 electrically. The connection between the first assistant light 40, the second assistant light 30, the electric member 50, and the rechargeable battery 60 can be conventional means, such as by wires, and is not shown for simplifying the drawings.

The lamp post 10 is vertical, and includes a holding pole 12 fixed on the ground and a connecting pole 14 fixed at a top end of the holding pole 12. The holding pole 12 includes a cylinder 121, and a plurality of light-guiding plates 122. The cylinder 121 is hollow and elongated. A receiving space 123 is defined in the cylinder 121. The light-guiding plates 122 are received in the space 123 and fixed on an inner surface 125 of the cylinder 121. The first assistant light 40 is fixed on one of the light-guiding plates 122 of the holding pole 12. A plurality of openings 120 are evenly defined in the cylinder 121 for light generated by the first assistant light 40 traveling therethrough to illuminate the holding pole 12 and an ambient environment surrounding the holding pole 12.

The cylinder 121 of the holding pole 12 has a plurality of holding parts 126 protruding inwardly from the inner surface 125 thereof. The holding parts 126 are spaced from each other with a constant distance. The holding parts 126 each extend along a length of the cylinder 121 and symmetrical to each other relative to a central axis of the cylinder 121. Each of the holding parts 126 includes two ribs 127 extending curvedly and toward each other from the inner surface 125 of the cylinder 121. Each holding part 126 defines a groove 128 between the two ribs 127 thereof. The two ribs 127 of each holding part 126 are slantwise and at an acute angle to the inner surface 125 of the cylinder 121, whereby each light-guiding plate 122 can be clipped between two neighboring holding parts 126 in the cylinder 121.

The light-guiding plates 122 are rectangular, elongated, and thin, and are made of semitransparent material for allowing a part of light generated by the first assistant light 40 to pass therethrough. Meanwhile, the light-guiding plates 122 reflect the other part of the light generated by the first assistant light 40 to other light-guiding plates 122. The light-guiding plates 122 are inserted into the cylinder 121 with opposite long sides thereof being located between the corresponding ribs 127 of the holding parts 126. The light-guiding plates 122 are thus secured in the cylinder 121 and positioned over the inner surface 125 of the cylinder 121 to evenly distribute the light generated by the first assistant light 40 to the openings 120 of the cylinder 121. Thus, even if there is only one light source in the cylinder 121, i.e., the first assistant light 40, light can evenly radiate through all of the openings 120 of the cylinder 121 to have an aesthetically appealing effectiveness.

The first assistant light 40 is placed in the cylinder 121 of the holding pole 12, located near one of the holding parts 126 and between two neighboring light-guiding plates 122. The first assistant light 40 includes an envelope 42, a plurality of lighting elements (not shown) received in the envelope 42 and two caps 44. The envelope 42 has a semicircular cross section and is made of translucent material for light emitted by the lighting elements passing therethrough. The two caps 44 respectively receive two opposite end portions of the envelope 42. Each of the caps 44 has a lug 48 formed thereon. An extending hole 46 is defined in the lug 48 for a screw extending therethrough to engage in the groove 128 between the ribs 127 of a corresponding holding part 126 of the cylinder 121 to secure the first assistant light 40 in the cylinder 121.

The connecting pole 14 includes a substrate 140 and a tube 142. The substrate 140 includes a circular board 144 and an annular wall 146 surrounding the board 144. The circular board 144 is mounted to the top end of the cylinder 121 of the holding pole 12 and thus seals the top end of the cylinder 121. The tube 142 is hollow, and has a bottom end fixed on the circular board 144 of the substrate 140 and an opposite top end. The rechargeable battery 60 is arranged on the circular board 144 of the substrate 140 and enclosed in the tube 142.

Figure 3:
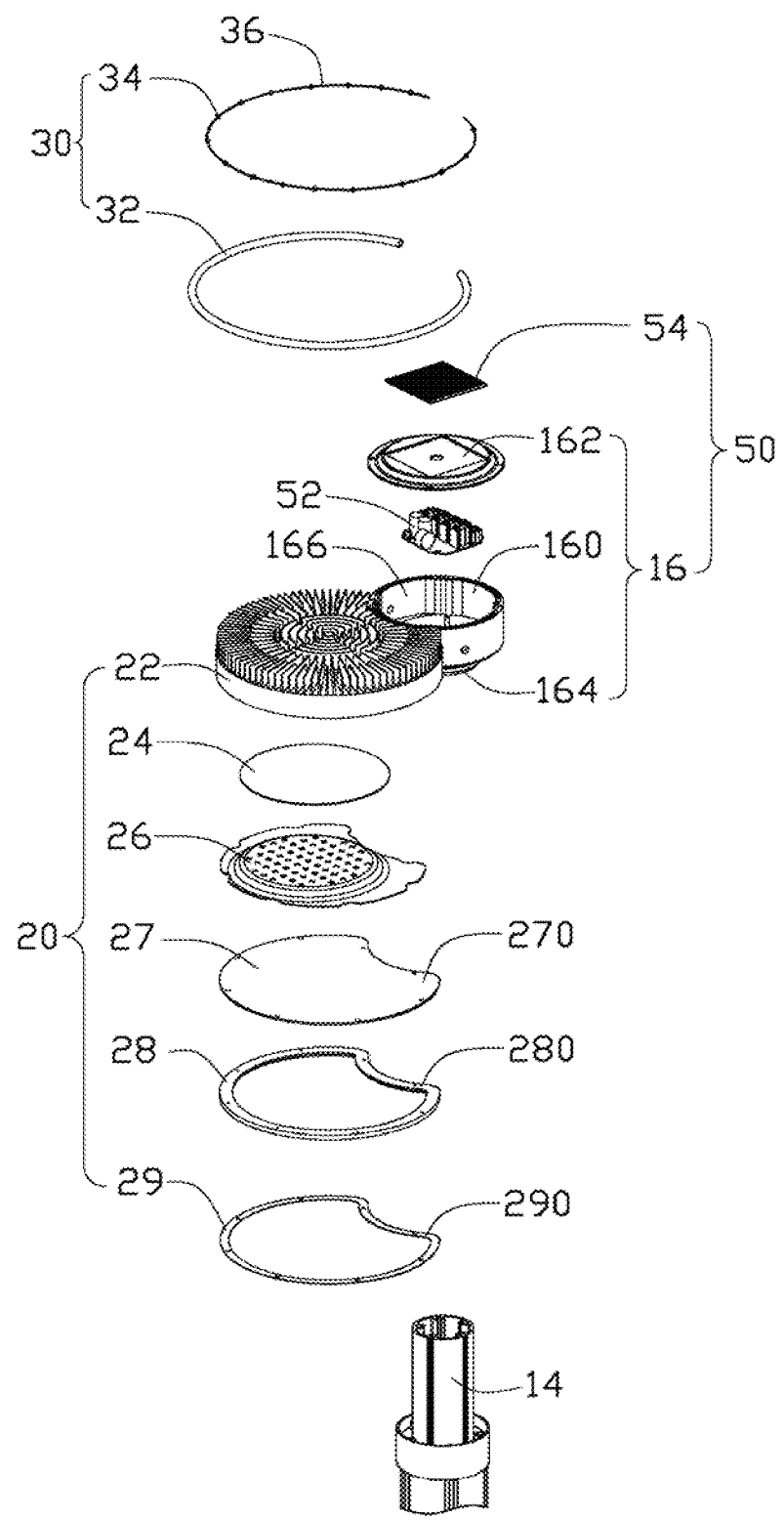
FIG. 3 is an exploded view of the LED lamp of FIG. 1.
Figure 4:
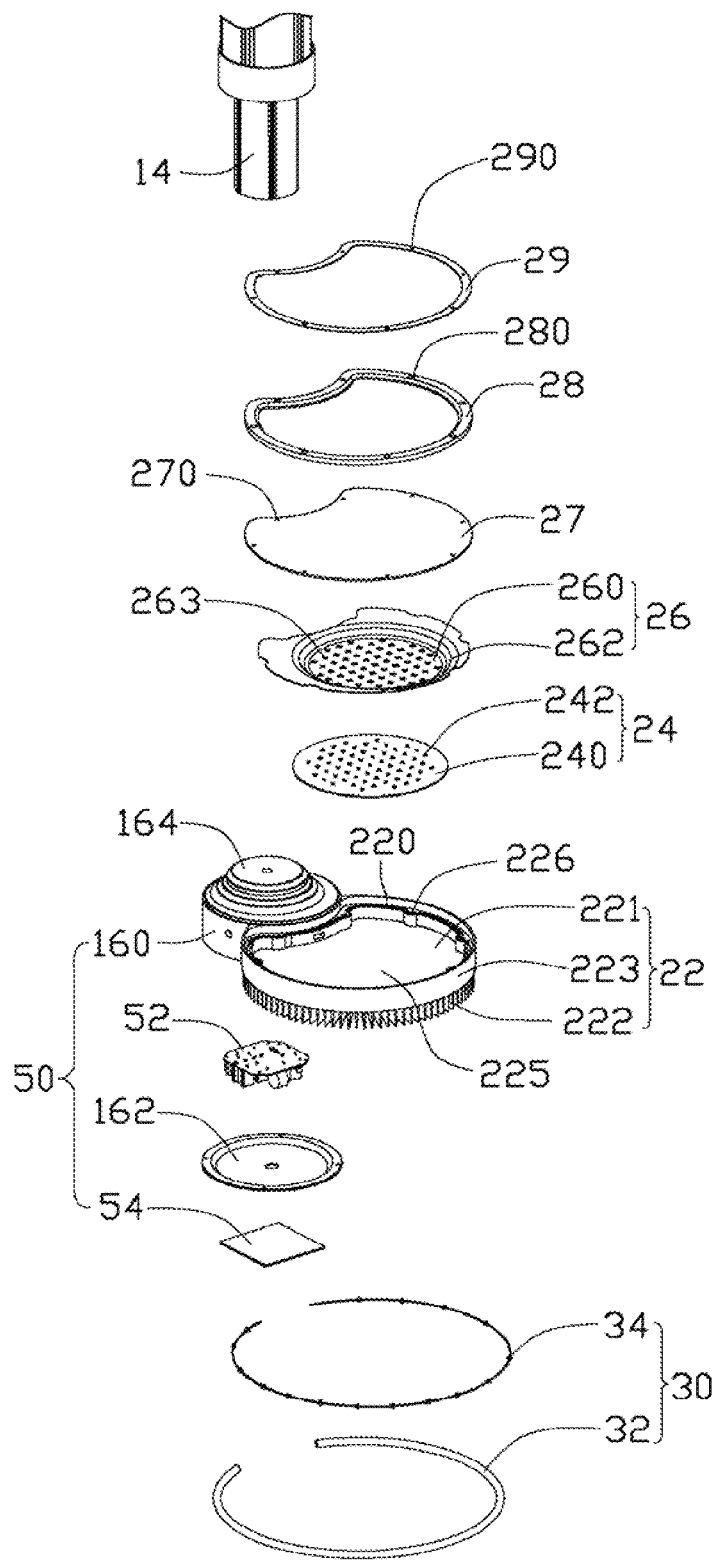
FIG. 4 is similar to FIG. 3, but viewed from a bottom aspect.

Referring to FIGS. 3 and 4, the electric member 50 is fixed on the top end of the tube 142 of the connecting pole 14. The electric member 50 includes a housing 16, a driving unit 52, and a solar panel 54. The driving unit 52 is used for controlling electric current supplied to the first assistant light 40 and the second assistant unit 30.

The housing 16 includes a bottom wall 164, a side wall 160 extending upwardly from an outer-periphery of the bottom wall 164, and a top wall 162 sealing a top end of the side wall 160. A chamber 166 is defined in the housing 16 among the bottom wall 164, the side wall 160 and the top wall 162. The driving unit 52 is received in the chamber 166 and fixed on the bottom wall 164. An output end of the driving unit 52 is connected to the first assistant light 40 and the second assistant light 30, and an input end of the driving unit 52 is connected to the rechargeable battery 60 received in the tube 142 of the connecting pole 14 of the lamp post 10. In other words, the rechargeable battery 60, the driving unit 52, and the first assistant light 30 cooperatively form a first circuit, and the rechargeable battery 60, the driving unit 52, and the second assistant light 40 cooperatively form a second circuit. The first circuit and the second circuit are in parallel.

The solar panel 54 is arranged on the top wall 162 of the housing 16 and thus is directly exposed to sunshine. The solar panel 54 is used for converting solar energy into electrical energy. The solar panel 54 is connected to an input end of the rechargeable battery 60 electrically, and thus the electrical energy converted thereby can be stored in the rechargeable battery 60, which enables the rechargeable battery 60 to provide electric current to the first assistant light 40 and the second assistant light 30 to emit light.

The second assistant light 30 is arranged at a lateral side of the electric member 50. The second assistant light 30 is substantially C-shaped, and has two ends respectively engaged into the side wall 160 of the hosing 16 of the electric member 50. The second assistant light 30 includes a hoop 32 made of transparent or translucent plastic or glass, and a plurality of lighting elements 34 arranged in the hoop 32. In this embodiment, the hoop 32 is arc-shaped, and has a curvature larger than that of the side wall 160 of the housing 16. The lighting elements 34 of the second assistant light 30 are approximately evenly spaced from each other, and are connected together by a wire 36. The lighting elements 34 of the second assistant light 30 can be fiber optic lighting or LED lighting and can generate different colors. It is to be understood that the lighting elements of the first assistant light 40 also can be fiber optic lighting or LED lighting and can generate different colors.

The major light 20 is arranged at the same lateral side of the electric member 50 as the second assistant light 30, and is surrounded by the second assistant light 30. The major light 20 includes a cooling member 22 and a light-emitting member.

The cooling member 22 is connected to the side wall 160 of the housing 16 at a position between the ends of the second assistant light 30. The cooling member 22 includes a base 221, a surrounding wall 223 extending downwardly from an outer periphery of the base 221, and a plurality of fins 222 extending upwardly from a top side of the base 221. A room 225 is defined between the surrounding wall 223 and the base 221 for receiving the light-emitting member therein. A step 220 is formed in the room 225 at a middle of the surrounding wall 223. A plurality of fixing holes 226 are defined in the step 220 for assembling the light-emitting member in the room 225, whereby the light-emitting member is surrounded by the surrounding wall 223 of the cooling member 22.

The light-emitting member includes a light source 24, a reflecting element 26, a cover 27, a sealing ring 28, and a fixing ring 29. The light source 24 includes a circuit board 240, and a plurality of LEDs 242 evenly arranged on and electrically connected to the circuit board 240. The circuit board 240 is arranged on the base 221, and electrically connected to an electrical power source for supplying an electric current to the LEDs 242. In this embodiment, the circuit board 240 is circular, and has a size smaller than that of the base 221 of the cooling member 22.

The reflecting element 26 includes a positioning plate 260, and a reflecting wall 262 extending downwardly from an outer periphery of the positioning plate 260. The positioning plate 260 has a shape and size the same as that of the circuit board 240. A plurality of apertures 263 are defined in the positioning plate 260 corresponding to the LEDs 242 of the light source 24. The reflecting wall 262 expands from the positioning plate 260 with a diameter thereof gradually increased from the positioning plate 260. The diameter of the reflecting wall 262 at a bottom substantially equals to an inner diameter of the surrounding wall 223 of the cooling member 22. A layer of reflecting material, such as mercury, is coated on the reflecting wall 262 for reflecting light of the LEDs 242 to the cover 27. A sum of a height of the circuit board 240 and a height of the reflecting wall 262 in a vertical direction is substantially the same as a distance between the base 221 and the step 220 of the cooling member 22. A contour of the bottom of the reflecting wall 262 substantially meets a contour of an inner periphery of the surrounding wall 223.

When assembled, the light source 24 is arranged on a central portion of the base 221 of the cooling member 22, and the reflecting element 26 is disposed into the room 225 with the LEDs 242 of the light source 24 of the major light 20 extending through corresponding apertures 263 of the positioning board 144. The positioning plate 260 abuts a bottom side of the circuit board 240. The LEDs 242 of the light source 24 of the major light 20 are surrounded by the reflecting wall 262 of the reflecting element 26. The bottom of the reflecting wall 262 is approximately coplanar with the step 220 of the cooling member 22. Screws thus can extend through the positioning plate 260 and the circuit board 240 into the base 221 of the cooling member 22 to assemble the light source 24 and the reflecting element 26 onto the cooling member 22. The circuit board 240 is thus urged upwardly to abut tightly against the base 221 of the cooling member 22. Heat generated by the LEDs 242 of the light source 24 of the major light 20 thus can be conducted to the base 221 of cooling member 22 and then to the fins 222 for further dissipation.

The cover 27 is made of transparent material, such as plastic or glass, and functions as an optical lens for guiding light emitted by the LEDs 242 of the major light 20 to ambient environment. The cover 27 has a profile similar to that of the step 220 of the cooling member 22. A plurality of mounting holes 270 are defined in an outer periphery of the cover 27, corresponding to the fixing holes 226 of the step 220 of the cooling member 22. The sealing ring 28 and the fixing ring 29 are similar to each other, each having the same shape and size as those of the step 220 of the cooling member 22. A plurality of engaging holes 280 are defined in the sealing ring 28, and a plurality of through holes 290 are defined in the fixing ring 29.

When assembled, the cover 27 is arranged on the step 220 of the cooling member 22 with the mounting holes 270 thereof aligning with the fixing holes 226 of the step 220. The sealing ring 28 is arranged on the cover 27, and the fixing ring 29 is arranged on the sealing ring 28. Finally, screws respectively extend through the through holes 290 of the fixing ring 29, the engaging holes 280 of the sealing ring 28, and the mounting holes 270 of the cover 27 into the fixing holes 226 of the step 220 of the cooling member 22 to assemble the cover 27 to the cooling member 22. Thus the bottom opening of the surrounding wall 223 of the cooling member 22 is hermetically sealed, and the light source 24 in the cooling member 22 is kept from environmental harm and mechanical damage.

During operation of the present LED lamp, not only the major light 20 is powered to generate light, the first and second assistant lights 40, 30 can also be powered to generate light by the rechargeable battery 60 which stores electrical energy converted from solar energy therein. The lighting elements of the first and second assistant lights 40, 30 can have different colors, and thus the light of the present LED lamp can be colorful. Furthermore, the first and second assistant lights 40, 30 are powered by solar energy, thereby being energy-saving and environment-friendly.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An LED lamp comprising:
a lamp post;
a major light arranged at a top end of the lamp post, the major light comprising a plurality of LEDs;
an assistant light arranged around the major light;
a solar panel electrically connected to the assistant light, the solar panel being arranged at a top of the LED lamp for converting solar energy to electrical energy to power the assistant light to emit light; and
another assistant light arranged in the lamp post, and connected to the solar panel electrically, a plurality of openings being defined in the lamp post for passing of light generated by the another assistant light to ambient environment.

2. The LED lamp of claim 1, wherein the assistant light comprises a plurality of color lights.

3. The LED lamp of claim 1, wherein the assistant light comprises a hoop and a plurality of lighting elements arranged in the hoop, the lighting elements being spaced from each other and connected together by a wire.

4. The LED lamp of claim 3, wherein the lighting elements comprise a plurality of LEDs.

5. The LED lamp of claim 4, wherein the LEDs have different colors.

6. The LED lamp of claim 3, wherein the lighting elements comprises a plurality of fiber-optic lights.

7. The LED lamp of claim 1, further comprising a battery connected to the solar panel to store the electrical energy converted by the solar panel.

8. The LED lamp of claim 7, further comprising an electric member arranged on the lamp post, the electric member comprising a housing connected to the lamp post and a driving unit received in the housing and interconnecting the battery and the assistant light for controlling electric current supplied to the assistant light by the battery, the solar panel being disposed on the housing.

9. The LED lamp of claim 1, wherein the major light comprises a cooling member and a light-emitting member arranged at a bottom side of the cooling member, the light-emitting member comprising the plurality of LEDs and received in the cooling member and a cover fixed on the cooling member to seal the LEDs between the cooling member and the cover.

10. An LED lamp comprising:
an elongated lamp post;
a major LED light fixed on a top of the lamp post;
a solar panel arranged on the lamp post and exposed to sunshine;
a battery received in the lamp post and connected to the solar panel;
an assistant light fixed on the lamp post; and
a driving unit interconnecting the assistant light and the battery to control electric current to the assistant light;
wherein the assistant light is received in the lamp post, and the lamp post defines a plurality of openings for emitting light of the assistant light.

11. The LED lamp of claim 10, wherein the assistant light is arranged around the major light, and comprises a curved hoop and a plurality of lighting elements in the hoop.

12. The LED lamp of claim 10, further comprising a housing fixed on the top end of the lamp post, the driving unit being received in the housing, the major light being fixed on a lateral side of the housing.

13. The LED lamp of claim 10, wherein the assistant light comprises a plurality of lighting elements selected from LEDs and fiber optic lights.

14. An LED lamp comprising:
a lamp post;
a major light arranged at a top end of the lamp post, the major light comprising a cooling member and a light-emitting member arranged at a bottom side of the cooling member, the light-emitting member comprising a plurality of LEDs and received in the cooling member and a cover fixed on the cooling member to seal the LEDs between the cooling member and the cover;
an assistant light arranged around the major light; and
a solar panel electrically connected to the assistant light, the solar panel being arranged at a top of the LED lamp for converting solar energy to electrical energy to power the assistant light to emit light.

15. The LED lamp of claim 14, wherein the assistant light comprises a plurality of color lights.

16. The LED lamp of claim 14, wherein the assistant light comprises a hoop and a plurality of lighting elements arranged in the hoop, the lighting elements being spaced from each other and connected together by a wire.

17. The LED lamp of claim 16, wherein the lighting elements comprise a plurality of LEDs.

18. The LED lamp of claim 16, wherein the lighting elements comprises a plurality of fiber-optic lights.

19. The LED lamp of claim 14, further comprising a battery connected to the solar panel to store the electrical energy converted by the solar panel.

20. The LED lamp of claim 19, further comprising an electric member arranged on the lamp post, the electric member comprising a housing connected to the lamp post and a driving unit received in the housing and interconnecting the battery and the assistant light for controlling electric current supplied to the assistant light by the battery, the solar panel being disposed on the housing.

* * * * *